UNITED STATES PATENT OFFICE.

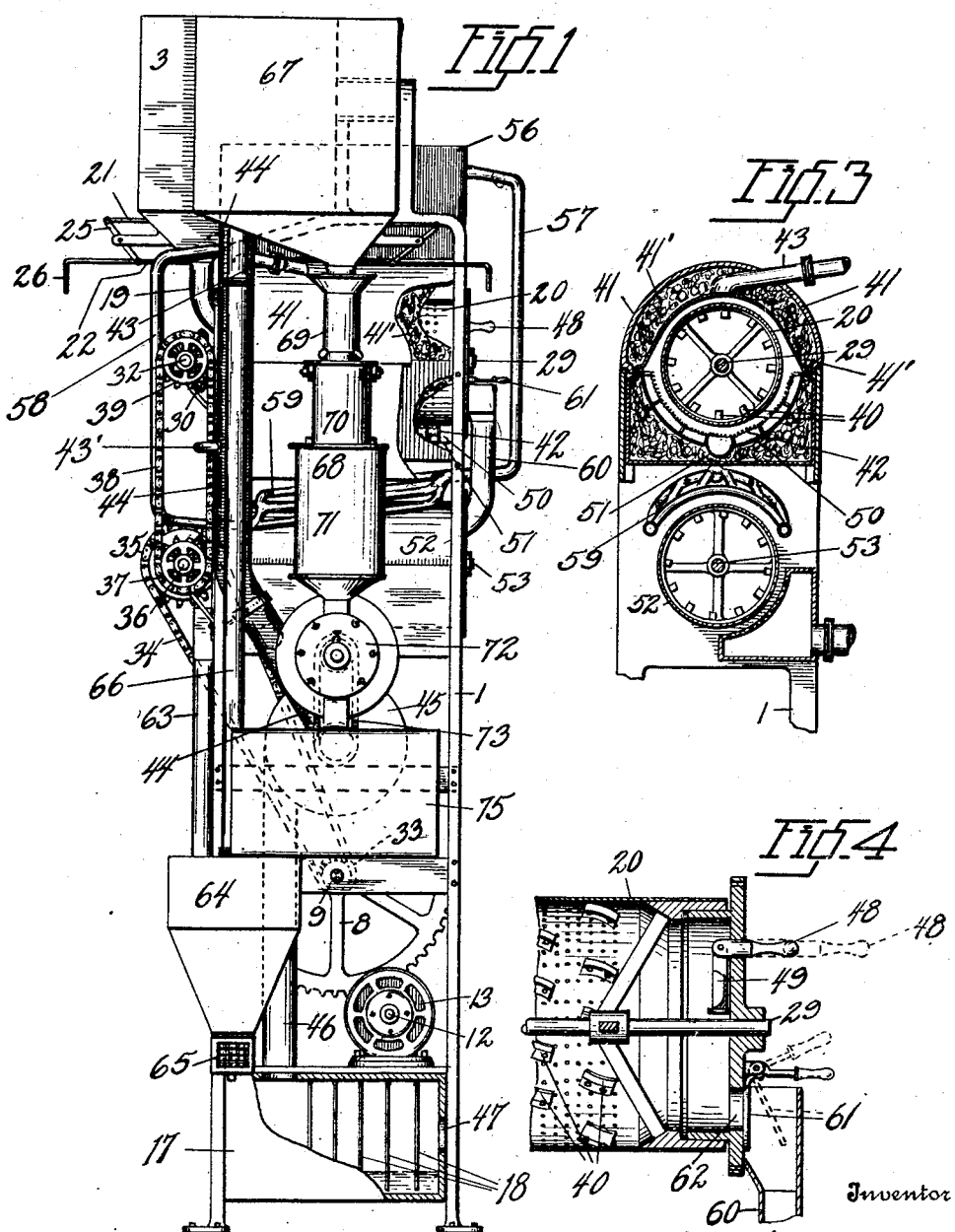

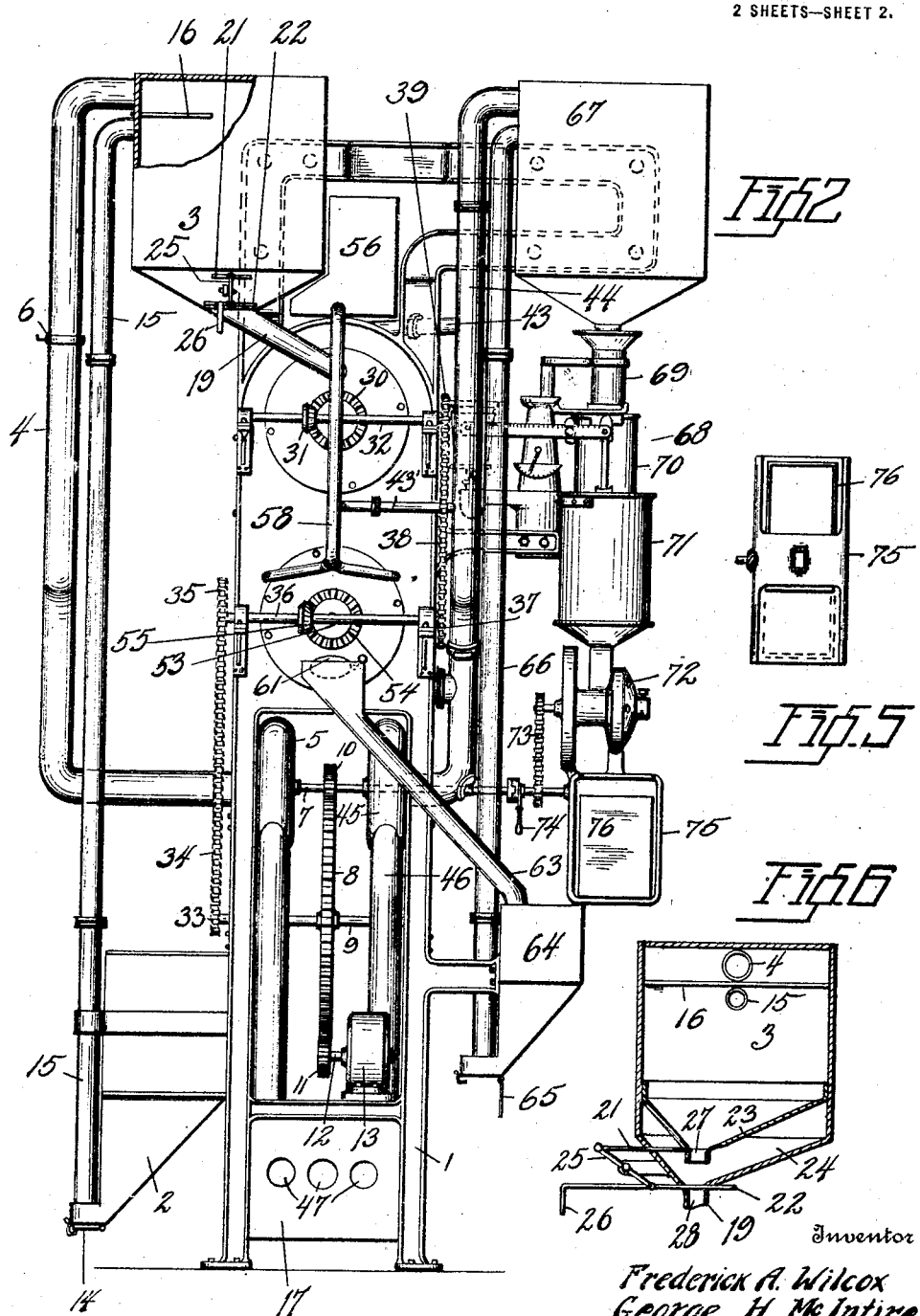

FREDERICK A. WILCOX AND GEORGE H. McINTIRE, OF SPOKANE, WASHINGTON, ASSIGNORS OF ONE-THIRD TO A. I. SWITZER, OF SPOKANE, WASHINGTON.

COFFEE-ROASTER.

1,298,130.

Specification of Letters Patent.

Patented Mar. 25, 1919.

Application filed April 8, 1918. Serial No. 227,308.

*To all whom it may concern:*

Be it known that we, FREDERICK A. WILCOX and GEORGE H. McINTIRE, citizens of the United States, residing at Spokane, in the county of Spokane and State of Washington, have invented certain new and useful Improvements in Coffee-Roasters, of which the following is a specification.

The present invention relates to improvements in coffee roasters, and is designed especially for the purpose of providing a compact apparatus or machine whereby the green coffee may be treated and prepared for delivery to a customer, with rapidity and despatch. The machine is especially applicable for use in a grocery or similar store wherein the green coffee may be measured, roasted, packed and finally delivered in a package as ground coffee, ready for use, and dispensed to the customer. As a spectacular machine or novelty device the apparatus may be inclosed in a glass case and when exhibited to the public will be interesting and attractive as it conveys the green coffee to the roaster, cools the roasted coffee, stores it, weighs the amount required, grinds the coffee and deposits the ground coffee in a bag or other receptacle.

Provision is also made for eliminating the odor of the roasting coffee by thoroughly washing the fumes as they come from the roaster, and the husks and chaff are also removed and thus prevented from deteriorating the coffee.

In the accompanying drawings one complete example of the physical embodiment of the invention is illustrated wherein the apparatus is constructed and arranged according to the best mode so far devised for the practical application of the principles of the invention.

Figure 1 is a side elevation of the complete machine embodying the invention.

Fig. 2 is a front elevation of the machine.

Fig. 3 is a transverse sectional view through the roasting and cooling cylinders, showing the heating and cooling devices for the respective cylinders.

Fig. 4 is a longitudinal sectional view at one end of the roasting cylinder, showing the testing device and the outlet gate for the cylinder.

Fig. 5 is a top plan view of the package receiver which receives coffee from the grinder.

Fig. 6 is a sectional view of the vacuum reservoir or hopper from which the green coffee is fed directly to the cylinder for roasting.

As before stated the machine is usually incased in a glass inclosure, but the inclosure has been omitted from the drawings for convenience of illustration, and the complete, compactly arranged apparatus is exemplified in its preferred form, as supported upon a main frame indicated by the numeral 1 which applies to all parts of the machine.

Near the base of the machine is located a supply hopper 2 in which the green coffee is deposited and from which it is drawn to the feed hopper 3 by suction through the pipe 4 and fan 5. The feed hopper 3 is located at the top of the frame, and the pipe 4, which is provided with a regulating valve 6, extends therefrom to the fan as shown. The fan is driven through its shaft 7 gear 8 on the main shaft 9, and smaller pinions 10 and 11, the latter on the motor shaft 12 of the motor 13.

The motor 13 is properly supported on the frame and is electrically driven to operate the moving parts of the apparatus as will be described hereinafter. The supply hopper 2 has a clean out door 14 at its lower end where the pipe 15 is connected and this pipe is the means of conveyance, by suction, of the green coffee from the supply hopper to the feed hopper, both the coffee conveying pipe and the suction pipe being attached or connected to the feed hopper near its upper closed end. The feed hopper is preferably an air-tight receptacle, having a plate 16 disposed horizontally therein between the points where the suction pipe and the coffee carrying pipe enter the hopper, to prevent the suction from carrying off the coffee beans from the feed hopper. Dust, chaff, etc., however, are carried downward from the feed hopper through pipe 4 to the washing chamber 17 located below the motor, and this chamber is partially filled with water and provided with a series of capillary screens 18, arranged vertically therein and composed of materials of suitable fabric to filter the fumes that are brought there from the roasting cylinder to be described.

From the feed hopper the green coffee is passed by gravity through the spout 19 to the roasting cylinder 20, and to preserve the vacuum in the feed hopper, a special construction is provided at the bottom of the feed hopper. A pair of slide gates 21 and 22 are utilized, and the first bottom 23 of the hopper forms an auxiliary chamber 24 below the hopper. By means of the pivoted lever arm 25, and handle 26 it will be seen that the gates 21 and 22 are adapted to close the two outlet nozzles 27 and 28, and by this means a quantity of coffee beans may be permitted to flow into the outlet chamber 24 of the feed hopper while the gate 22 is closed, then by means of the handle and lever the position of the gates may be reversed and the coffee passes from the feed chamber 24 through the spout to the roasting cylinder 20, without opening the feed hopper to break the vacuum therein.

The roasting cylinder 20 is of perforated sheet metal supported and revolved on the shaft 29 journaled in the frame of the machine, and through the gear ring 30 at one end, and the pinion 31 on the shaft 32, the cylinder is revolved, power being conveyed from the motor through driving shaft 9, sprocket 33 on this shaft, sprocket chain 34, sprocket wheel 35 on shaft 36, sprocket wheel 37 on shaft 36, sprocket chain 38, and sprocket wheel 39 on shaft 32.

The interior walls of the cylinder are provided with metal blades 40, to stir the coffee beans as they are being roasted and tumbled about in the revolving cylinder which, as before stated receives the green coffee beans from the feed hopper 3. Preferably a casing or housing 41 is provided for the roasting cylinder and non-conducting material is provided at 41' for insulation to prevent radiating of heat, from the electrical heater indicated at 42 which is located beneath the lower half of the revolving cylinder. The fumes and smoke from the roasted coffee are collected in the housing above the cylinder and are carried off from there through the smoke pipe 43 which extends from the housing above the cylinder, over to the vertical suction pipe 44 which opens into the fan casing 45 for a second fan on the fan shaft 7, and the additional pipe 46 extends from the fan to the smoke washing chamber 17, so that the fumes are drawn from the roasting cylinder by the fan and driven through the screens 18 in the washing chamber where all smoke, dust, etc., are eliminated by their passage through the moistened filtering screens 18, and outlet through the opening 47 from the washing chamber.

After the coffee beans have been sufficiently roasted they are tested or inspected, and for this purpose a handle 48 is provided in one end of the cylinder, and inside the cylinder a cup 49 is pivoted to the handle, the outer end of the handle projecting sufficiently to be grasped by the hand to withdraw the handle and cup so that the beans in the cup may be inspected in the usual manner. Preferably a cylindrical reflecting plate 50 is provided beneath the electrical heater below the roasting cylinder, to reflect the heat units toward the cylinder, and this plate also serves as a guide down which the dust, chaff, etc., passes to the central channel or trough 51, in which the extraneous material is gathered, and from which it passes out through the pipe 43'.

After being properly roasted the coffee beans are then cooled, and for this purpose a second revolving cylinder 52 is utilized, the same being journaled on shaft 53, and revolved from the shaft 36 through the gear ring 54, and bevel pinion 55 on the shaft. A water tank 56 is provided near the top of the apparatus and the pipes 57 and 58 are connected with the coil 59 located just above the cooling cylinder 52, so that when the roasted coffee passes from the roasting cylinder, through the spout 60 to the cooling cylinder, the water circulation carries off the radiated heat from the coffee in the cooling cylinder. The roasted coffee is admitted to the spout 60 from the roasting cylinder by means of the controlling gate or valve 61 which controls the opening 62 in one end of the roasting cylinder.

After being cooled in the cooling cylinder, the coffee is passed therefrom through the downwardly inclined spout 63 and to the receiving hopper 64 for the roasted coffee, from whence it may be disposed of through the bottom door or gate 65, as desired. Preferably however, the coffee beans are further treated in this machine, and to that end they are conveyed from the receiving hopper, by suction, upwardly through the pipe 66 to the reservoir 67 near the top of the machine, and in which a vacuum or partial vacuum is created by means of the suction pipe 44 before described. From the reservoir the coffee may be admitted to the weighing device indicated at 68 which includes the successively enlarged cylindrical inclosures 69, 70, 71, and from the last mentioned inclosure the weighed coffee passes to the coffee grinder 72 which is operated from the shaft 7 by means of the sprocket chain 73 and suitable sprocket wheels, which are controlled by the clutch device indicated at 74, and from the grinder the ground coffee passes by gravity to the housing 75 or rather to a receptacle 76 in the housing to be deposited in a bag or wrapper as desired.

From the above description taken in connection with the drawings it will be apparent that the coffee is taken in the green state and elevated by suction from the supply to the storage tank, during which movement extraneous matters are separated from the coffee, and the green coffee passes, by gravity, from the feed tank to the roasting cylinder which revolves above the electric heating element. The smoke and vapor arising from the roasting operation are carried off through a small opening in the hood of the roaster, and when the coffee has reached the proper brown, it is discharged into the revolving cooling cylinder over the cooling box which covers approximately one half the area of the cylinder to allow admission of the cool air to the cylinder. After the coffee has been properly cooled, it is dumped into the discharge hopper and conveyed therefrom to the elevator tank from which it is conveyed by suction through the glass tube to the vacuum storage tank for the roasted coffee. The roasted coffee is then weighed, automatically, and sold, either in package before grinding, or is admitted to a coffee grinder, and then after grinding, is packaged and ready for sale.

What we claim is:—

1. The combination in a coffee roasting apparatus including a roasting cylinder, of a cooling cylinder below the roasting cylinder to receive roasted coffee therefrom, a lower hopper and spout receiving coffee by gravity from the cooling cylinder, an elevated reservoir and means for conveying the cooled roasted coffee thereto, and dispensing means coacting with said reservoir.

2. The combination in a coffee roasting apparatus with a roasting cylinder, a cooling cylinder to receive roasted coffee therefrom, and a motor for revolving said cylinders, of a supply hopper and a feed hopper, and suction means actuated from the motor for conveying green coffee from the supply hopper to the feed hopper.

3. The combination in a coffee treating apparatus with a revoluble roasting cylinder and a revoluble cooling cylinder in communication and means for revolving the cylinders, of a heating device for the roasting cylinder, and a cooling device for the cooling cylinder combined as described.

4. The combination with a coffee roasting cylinder and its heater, of a coffee cooling cylinder adapted to receive coffee therefrom, and means for revolving the cylinders, a water circulation pipe system about the cooling cylinder, and means for supplying coffee to the roasting cylinder and withdrawing cooled coffee from the cooling cylinder.

5. The combination with a roasting cylinder, of an elevated feed hopper and a supply hopper and means for creating a suction in the feed hopper for conveying coffee from the supply hopper to the feed hopper, a spout from the feed hopper to the cylinder, and means for maintaining the suction in the feed hopper while permitting gravity discharge of coffee therefrom to the cylinder.

6. The combination with a roasting cylinder of a feed hopper and a discharge spout from the hopper to the cylinder, said feed hopper having means for forming a partial vacuum therein for conveying coffee thereto, and said hopper formed with a false bottom and a pair of oppositely operating gates to control the exit of coffee therefrom as described.

In testimony whereof we affix our signatures.

FREDERICK A. WILCOX.
GEORGE H. McINTIRE.